(12) United States Patent
Kawai et al.

(10) Patent No.: US 8,232,886 B2
(45) Date of Patent: Jul. 31, 2012

(54) BATTERY MANAGEMENT SYSTEM FOR ELECTRIC VEHICLE

(75) Inventors: Nobuyuki Kawai, Okazaki (JP);
Toshihide Tanaka, Okazaki (JP);
Takayuki Akaboshi, Okazaki (JP);
Yasunori Iizuka, Okazaki (JP);
Shinichiro Makihara, Kamagori (JP);
Kazunori Handa, Nishio (JP)

(73) Assignees: Mitsubishi Jidosha Kogyo Kabushiki Kaisha, Tokyo (JP); Mitsubishi Jidosha Engineering Kabushiki Kaisha, Okazaki-Shi, Aichi (JP)

( * ) Notice: Subject to any disclaimer, the term of this patent is extended or adjusted under 35 U.S.C. 154(b) by 311 days.

(21) Appl. No.: 12/445,395

(22) PCT Filed: Mar. 14, 2008

(86) PCT No.: PCT/JP2008/055186
§ 371 (c)(1),
(2), (4) Date: Jun. 15, 2009

(87) PCT Pub. No.: WO2009/041091
PCT Pub. Date: Apr. 2, 2009

(65) Prior Publication Data
US 2010/0182154 A1    Jul. 22, 2010

(30) Foreign Application Priority Data
Sep. 28, 2007    (JP) .................. 2007-256427

(51) Int. Cl.
*G08B 21/00* (2006.01)
*B08B 1/00* (2006.01)
*H04Q 5/22* (2006.01)
*H02J 7/00* (2006.01)

(52) U.S. Cl. .................. 340/636.1; 340/635; 340/10.52; 340/438; 320/116; 320/120; 320/136

(58) Field of Classification Search .................. None
See application file for complete search history.

(56) References Cited

U.S. PATENT DOCUMENTS
7,760,106 B2 *   7/2010   Vandensande et al. .... 340/636.1

FOREIGN PATENT DOCUMENTS
| GB | 2 341 258 A | 3/2000 |
| JP | 2000-78759 A | 3/2000 |
| JP | 2000-173674 A | 6/2000 |

* cited by examiner

*Primary Examiner* — Julie Lieu
(74) *Attorney, Agent, or Firm* — Birch, Stewart, Kolasch & Birch, LLP

(57) ABSTRACT

The invention provides a battery management system which can reliably and easily manage a power unit of an electric vehicle. The power unit includes a plurality of battery modules. The battery management system includes: a power source for a motor, the power source being constituted by a plurality of battery modules having battery cells; battery module status sensors mounted on the battery modules on the one to one basis, detecting voltages and temperatures of the battery modules; and a control unit judging statuses of the battery modules on the basis of data detected by the battery module status sensors. The battery module status sensors are mutually connected in series by a communication line for transmitting numbering data, and each battery module status sensor assigning itself with an ID code on the basis of ID information received from an upstream battery module status sensor, and transmitting the ID information as well as the ID code to a downstream battery module status sensor. The control unit is connected to the battery module status sensors via the communication line for transmitting the numbering data and a communication line for transmitting various data except for the numbering data, and locates an abnormal battery module on the basis of detection information received via the communication line for transmitting the numbering data and the communication line for transmitting various data except for the numbering data.

2 Claims, 5 Drawing Sheets

| Communication protocol | |
|---|---|
| Communication system | Unidirectional and asynchronous (conforming to UART) |
| Start bit (ST) | 1 bit |
| Data bit | 8 bit |
| Parity bit(PT) | 1 bit even parity |
| Stop bit(SP) | 1 bit |
| Communication speed | 19.2kbps ± 1% |
| Interface | Conforming to ISO9141 |

FIG. 4(a)

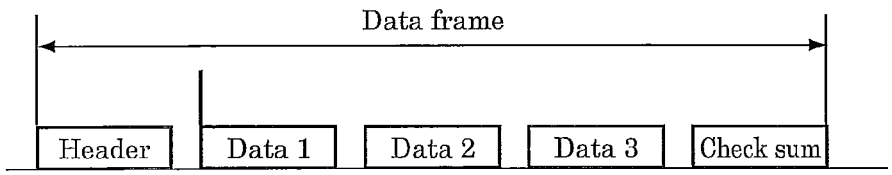

FIG. 4(b)

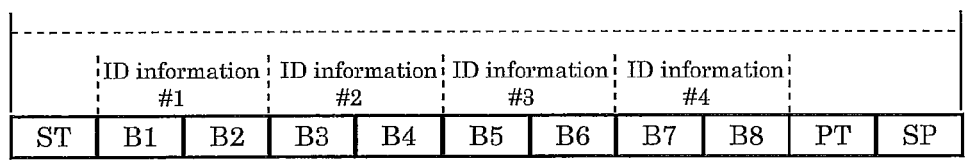

FIG. 5

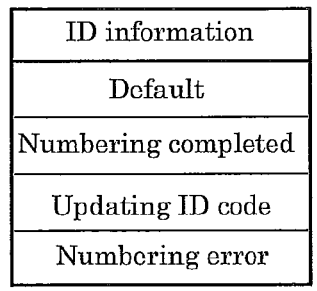

FIG. 6

ID information table

|  | ID information #1 | ID information #2 | ID information #3 | ID information #4 |
|---|---|---|---|---|
| Data 1 | Automatically assigned #1 | Automatically assigned #2 | Automatically assigned #3 | Automatically assigned #4 |
| Data 2 | Automatically assigned #5 | Automatically assigned #6 | Automatically assigned #7 | Automatically assigned #8 |
| Data 3 | Automatically assigned #9 | Automatically assigned #10 | Automatically assigned #11 | Automatically assigned #12 |

BATTERY MANAGEMENT SYSTEM FOR ELECTRIC VEHICLE

FIELD OF THE INVENTION

The present invention relates to a battery management system for an electric vehicle which includes a power supply constituted by a plurality of battery modules.

BACKGROUND OF THE INVENTION

Generally, an electric vehicle is loaded with a motor as a drive unit and a battery unit serving as a power supply, both of which are mounted on a body of the electric vehicle. A travel distance of the electric vehicle depends upon performance and capacity of the battery unit. The battery unit includes a plurality of rechargeable battery modules. However, not only repeated charges and discharges but also temperatures tend to age battery modules relatively quickly. When a plurality of battery modules are provided, they will be differently aged depending upon their installed locations. Therefore, it is very difficult to judge which and how battery modules are aged. Japanese Patent Laid-Open Publication Hei 7-311248 discloses a method in which voltage measuring wires are connected to battery terminals during maintenance, and aged batteries are identified based on voltage variations obtained by the measuring wires.

SUMMARY OF THE INVENTION

Problems to be Solved by the Invention

Referring to the foregoing patent publication, each time a worker checks statuses of batteries, he or she has to connect battery terminals to a sensor circuit using voltage measuring and sensing wires and clips or the like, and identifies aged batteries based on sensed voltages, which is a cumbersome procedure.

The present invention is intended to provide a battery management system which can easily and precisely manage a battery unit which is constituted by a plurality of battery modules and is applied to an electric vehicle.

Means to Solve Problems

As defined in claim 1, a battery management system includes: a power source constituted by a plurality of battery modules having battery cells; battery module status sensors mounted on the battery modules on the one to one basis, detecting voltages and temperatures of the battery modules, and mutually connected in series by a communication line for transmitting numbering data, and each battery module status sensor assigning itself with an ID code on the basis of ID information received from an upstream battery module status sensor, and transmitting the ID information as well as the ID code to a downstream battery module status sensor; and a control unit judging statuses of the battery modules on the basis of data detected by the battery module status sensors, connected to the battery module status sensors via the communication line for transmitting numbering data and a communication line for transmitting various data except for the numbering data, and locating an abnormal battery module on the basis of detection information received via the communication line for transmitting numbering data and the communication line for transmitting various data except for the numbering data.

In the foregoing battery management system, the battery module status sensors and the control unit are circularly connected by the communication line for transmitting the numbering data.

Effects of the Invention

According to the invention, when detecting a status of a battery module, a battery module status sensor assigns itself an ID code on the basis of ID information from an upstream battery module status sensor to which the foregoing battery module status sensor is connected in series via the communication line for transmitting numbering data, and transmits the ID information and the assigned ID code to a downstream battery module status sensor. This facilitates identification of battery modules without paying any attention to the arrangement of the battery modules. The battery module state sensors are provided for the battery modules on one to one basis, are assigned the ID codes, and are of the same kind, it is possible to reduce kinds of components and the cost of managing the battery modules, and to prevent erroneous connection of the battery modules and the battery module status sensors. Further, the control unit is connected to the battery module status sensors using the communication line for transmitting the numbering data and the communication line for transmitting various data except for the numbering data, and can pinpoint each abnormal battery module on the basis of information received from each battery module status sensor. The control unit can electrically identify the abnormal battery module without troublesome operation. This allows easy and effective management of the battery modules.

Further, when the battery modules and battery module status sensors are arranged in the shape of a loop, the control unit can identify abnormal battery modules in a concentrated way. This is effective in simplifying functions of the battery module status sensors.

BRIEF DESCRIPTION OF THE DRAWINGS

FIGS. 4(a) and 4(b) show formats of the data sent by the battery module status sensors.

FIG. 5 shows contents of items contained in ID information.

FIG. 6 is an ID information table used to automatically number pieces of the ID information stored in the battery module status sensors.

Figure 1:
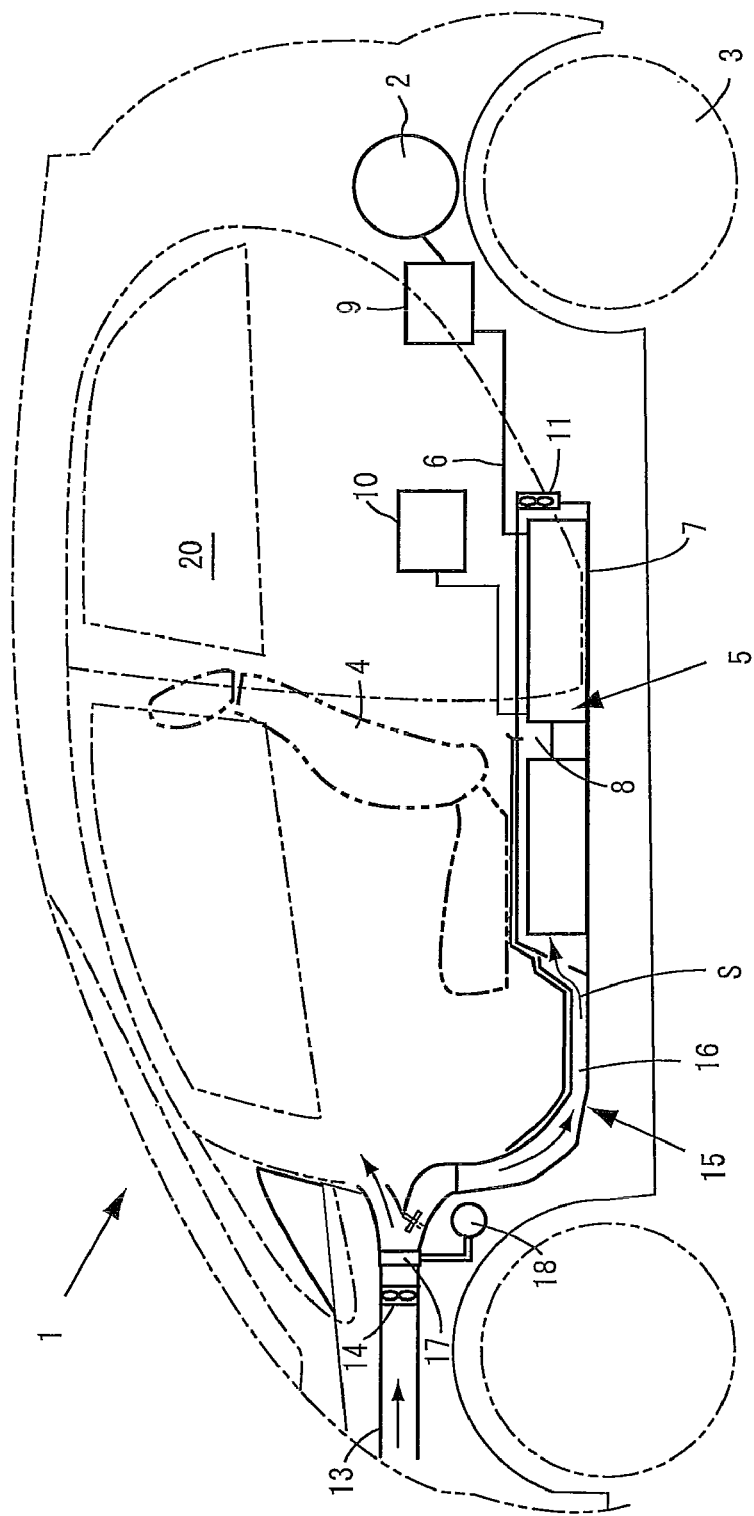
FIG. 1 schematically shows a structure of an electric vehicle to which the invention is applied.

DESCRIPTION OF REFERENCE NUMERALS 1 electric vehicle
2 motor
3 wheels
5 battery unit
5A~5L battery modules
10 control unit
12A~12L battery module status sensors 21 communication line for transmitting numbering data
22 communication line for transmitting various data except for numbering data
30 battery management system

BEST MODE FOR CARRYING OUT THE INVENTION

The invention provides a battery management system which can precisely and easily manage a battery unit which includes a plurality of battery modules, and is applicable to an electric vehicle. With the battery management system, battery modules and a control unit are connected by means of a communication line for transmitting numbering data and a communication line for transmitting various data except for the numbering data. The control unit detects abnormal battery modules on the basis of detected data which are sent via the communication for transmitting numbering data and the communication line for transmitting various data.

Embodiment

The invention will be described with reference to an embodiment shown on the drawings. Referring to FIG. 1, an electric vehicle 1 travels by rotating wheels 3 which are activated by a motor 2. A battery unit 5 supplies power to the motor 2, and is located under a seat 4 in a vehicle interior 20. The battery unit 5 is configured as a battery pack having a plurality of battery modules. Each battery module includes a plurality of battery cells. Further, the battery unit 5 is housed in a battery unit container 8 defined by a floor panel 6 (constituting a vehicle body) and a shield 7 under the floor panel 6. In the battery unit 5, twelve battery modules 5A to 5L are connected in series as shown in FIG. 2.

The electric vehicle 1 is provided with an inverter 9 connected to the battery unit 5, and a cooling unit 15. The cooling unit 15 is used to cool the battery unit 5, and is constituted by an exhaust fan 11 housed in the battery unit container 8, an air blower 14 having an air intake path 13, and a compressor 18. The cooling unit 15 is configured to take airstreams S in via the air intake path 13 and a heat exchanger 17, actuate the compressor 18, cool the airstreams S by circulating a cooling medium in a freezing cycle, introduce the cooled airstreams to the battery unit container 8 via a duct 8, and discharge warmed airstreams to the exterior by operating the exhaust fan 11.

Figures 2, 3:
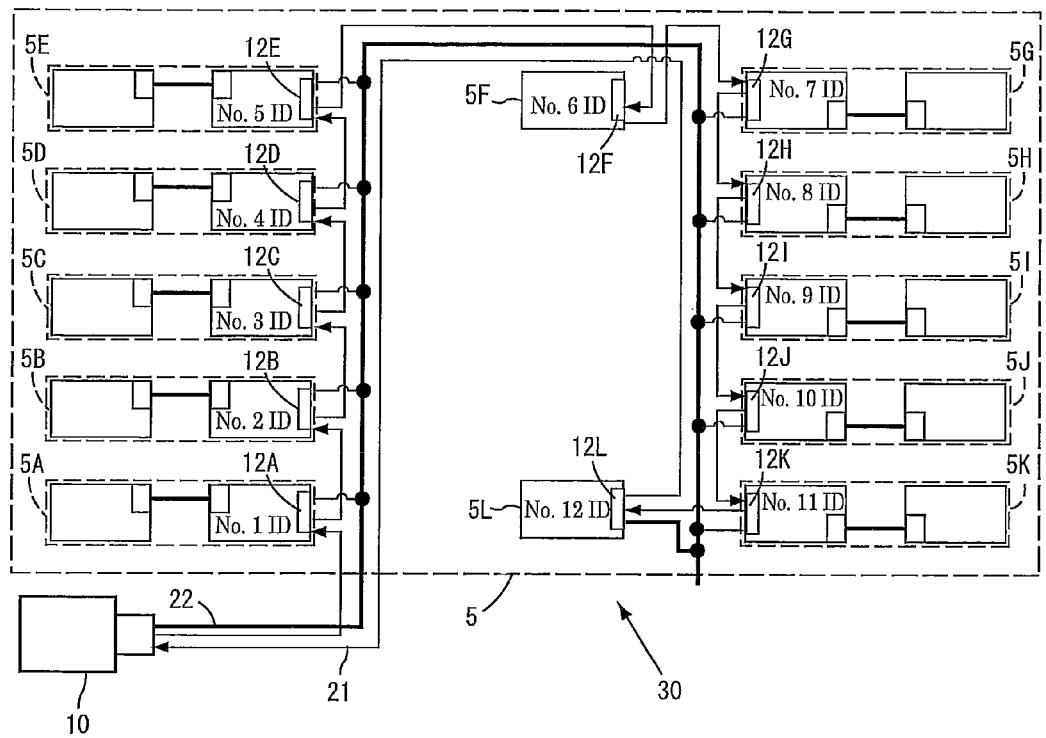
FIG. 2 is a block diagram showing configurations of a battery unit and a control unit.
FIG. 3 is a table showing a communication protocol for data to be sent by battery module status sensors.

The electric vehicle is provided with a battery management system 30 as shown in FIG. 2. The battery management system 30 is constituted by a plurality of module status sensors 12A to 12L and a control unit 10. The battery module status sensors 12A to 12L are provided for the battery modules on one to one basis. The control unit 10 judges statuses of the battery modules detected by the module status sensors 12A to 12L.

The battery module status sensors 12A to 12L are popular computers, have the same configuration, and are mounted on each of the battery modules. The battery module status sensors 12A to 12L are connected in series, with the control unit 10 at the beginning, by the communication line for transmitting the numbering data 21 (called the "communication line 21" hereinafter), and perform unidirectional communications. Opposite ends of the communication line 21 are connected to the control unit 10. The battery module status sensors 12A to 12L are also connected to the control unit 10 via a communication line 22 for transmitting various data except for the numbering data (called the "communication line 22" hereinafter), and transmit and receive information such as temperatures and voltages to and from the control unit 10.

Each of the battery module status sensors 12A to 12L assigns an ID code to itself on the basis of ID information received from an upstream module status sensor, and transmits the ID information including the ID code to a downstream battery module status sensor.

The control unit 10 is constituted by a well-known computer, and is configured to receive temperature and voltage data from the battery module status sensors 12A to 12L via the communication line 22, store the received data, and transmit the ID information to the downstream battery module status sensor 12A. Further, the control unit 10 is configured to link the temperature and voltage data (from the battery module status sensors 12A to 12L) to the ID codes sent by the communication line 21, and store them. The control unit 10 has criterion on a reference voltage and a reference temperature.

Data from one battery module status sensor are communicated in accordance with a communication protocol shown in FIG. 3, and are formatted as a numbered data frame as shown in FIG. 4(a). The communication protocol defines the following: a communication method is unidirectional and asynchronous (UART compliance); a start bit (ST) is one bit; a data bit is eight (8) bits; a priority bit (PT) is one bit even parity; a stop bit (SP) is one bit; a communication speed is 19.2 kbps±1%, for instance; and an interface (I/F) is ISO 9141, for instance.

The numbered data frame includes a header, a string of numbered data, and a check sum. The header represents that the data detected by the control unit 10 are sent from a certain battery module status sensor. The data in the data frames are constituted by ID information #1 to ID information #4 as shown in FIG. 4(b). The ID information covers a default, completion of numbering, change of ID code, and a numbering error.

In this embodiment, a numbering sequence and automatic numbering are differently set as shown in FIG. 6. An ID information table is stored in each battery module status sensor. Each battery module status sensor automatically assigns itself a number in accordance with the ID information table, and stores the automatically assigned number.

Figure 7:
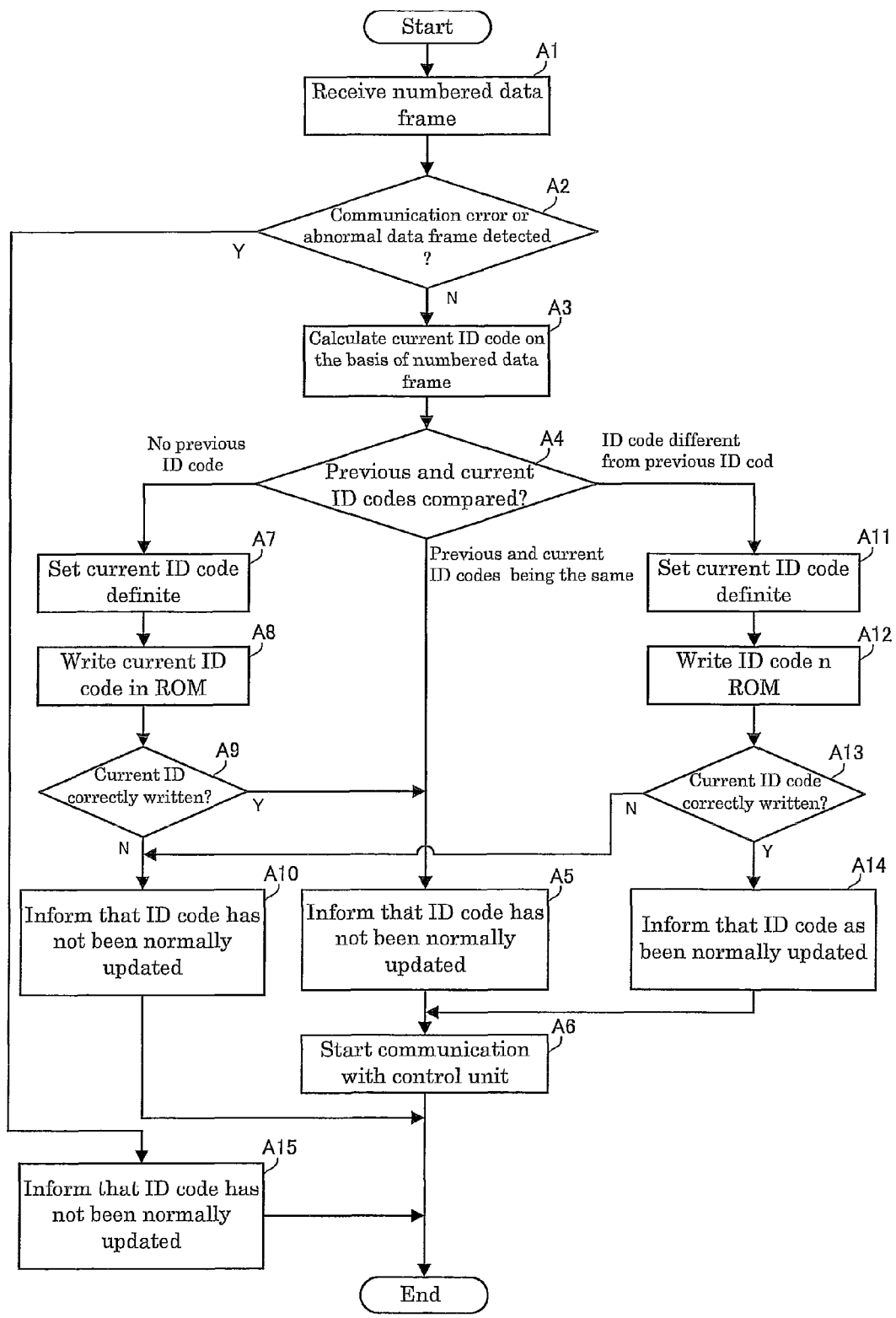
FIG. 7 is a flowchart of an automatic numbering control process which is executed by the battery module status sensors.

The automatically assigned number of each battery module status sensor is controlled as shown in a flowchart of FIG. 7. It is assumed here that the control unit 10 is activated when its power source is turned on by operating an ignition switch of the electric vehicle.

In step A1, one of the battery module status sensors receives a numbered data frame when an ignition switch is turned on. A communication error or an abnormality of the data frame is detected in step A2. If there is no error or abnormality, the control process proceeds to step A3. In step A3, a currently numbered ID code (called the "current ID code") is calculated on the basis of the data table (shown in FIG. 6), and the control process proceeds to step A4.

In step A4, the current ID is compared to a previously numbered ID code (called the "previous ID code"), and contents of the current ID code are determined. If the previous and current ID codes are the same, the control process proceeds to step A5. In step A5, the battery module status sensor transmits, to the control unit 10, information that its ID information has been correctly assigned with the current ID code. In step A6, the battery module status sensor communicates with the control unit 10 via a signal line 14, and the control unit 10 finishes its control.

If the battery module status sensor has no previous ID code and is assigned with a new ID code in step A1, the control process proceeds to step A7. In step A7, the battery module status sensor recognizes that it has the current ID, which has been calculated in step A3, as its own ID code. In step A8, the battery module status sensor stores the current ID code in its ROM, and proceeds to step A9. In step A9, it is checked whether or not data writing has been normally completed. When the data have been normally written, the control process proceeds to step A5. The battery module status sensor notifies the control unit 10 that the ID information has been assigned with the correct ID code. If the data writing is abnormal, the control process proceeds to step A10. The battery module status sensor notifies the control unit 10 that its ID information has not been assigned with the correct ID code, and finishes its control operation.

When the previous and current ID codes are different in step A4, the control process proceeds to step A11. In step A11, the battery module status sensor determines that the current ID calculated in step A3 has been assigned to itself, and writes the information concerning the current ID in its ROM. The control process proceeds to step A13. It is checked whether or not the data wiring is normally completed. When the data writing is normal, the control process proceeds to step A14. In step A14, the battery module status sensor notifies the control unit 10 that its numbered ID code has been normally updated in the ID information, starts to communicate with the control unit 10 via the communication line 14, and finishes the control operation. If the data writing is not normal, the control process proceeds to step A10. The battery module status sensor notifies the control unit 10 that the numbered ID code has not been normally assigned to its ID information, and finishes its control operation.

For instance, when the control unit 10 transmits information concerning a first numbered data frame, the battery module status sensor 12A which is downstream of the control unit 10 receives the information. The battery module status sensor 12A checks the contents of the information, and sends its own ID information to the battery module status sensor 12B. The remaining battery module status sensors perform the information transmission and control in the similar manner, and finally return the information to the control unit 10.

The control unit 10 prepares data tables for respective battery modules in accordance with the assigned ID codes included in the numbered data frames which are received from the module status sensors. When the communication is started in step A6, the temperature and voltage data are made to correspond to the assigned ID codes, and write and store them in the data tables.

The temperature and voltage data written in the data tables are compared to the reference voltage and temperature, so that battery statuses will be determined. For instance, if the detected voltage is lower than the reference voltage, or if the detected temperature is higher than the reference temperature, the battery module corresponding to the battery module status sensor is judged to be abnormal. This will be notified to a driver by an alarm or an alarm lamp which is installed near a driver's seat.

In the foregoing battery management system 30, the battery module status sensors 12A to 12L are connected in series using the communication line 21. Statuses of the battery modules 5A to 5L constituting the battery unit 5 are detected by the battery module status sensors 12A to 12L. A certain battery module assigns itself with an ID code in accordance with ID information received from an upstream battery module status sensor, and transmits the assigned ID code as well as the ID information to a downstream battery module status sensor. Therefore, it is possible to correctly identify the battery module on the basis of the assigned ID code without paying any attention to the arrangement of the battery modules. Further, the control unit 10 is connected to the battery module status sensors using the communication line 21 and the communication line 22. The control unit 10 locates an abnormal battery module on the basis of detection information received via the communication line 22. In other words, the control unit 10 can electrically locate the abnormal module without troublesome work, which enables the worker to manage the battery unit 5 with ease.

It is conceivable that the battery module status sensors do not assign themselves with ID codes for identifying themselves, and that the battery modules may be provided with battery module status sensors having ID codes. In such a case, the battery module status sensors are related to one another on the one to one basis, which will lead to erroneous combinations. The configuration of the battery management system of this invention can overcome the foregoing problem, and improve workability. Further, each of the battery module status sensors 12A to 12L having its own ID code and the same configuration can be mounted on each of the battery modules 5A to 5L. This is effective in commoditizing the components and reducing a cost of the battery management system.

Figure 8:
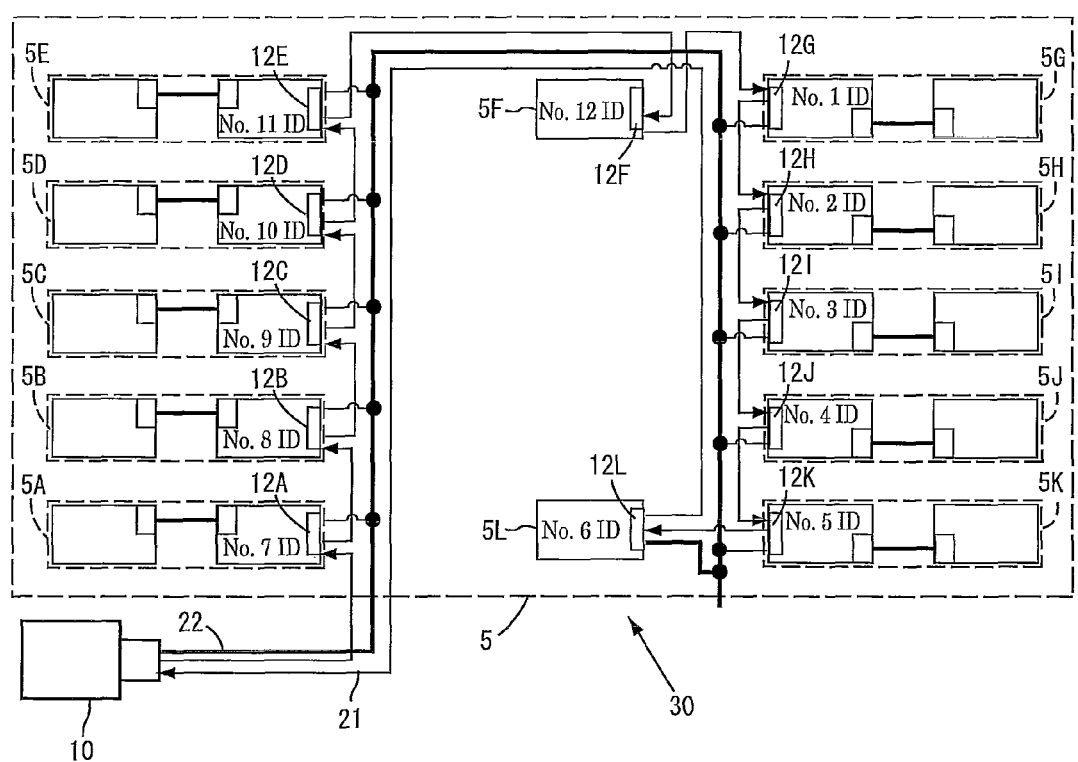
FIG. 8 is a block diagram of a modified automatic numbering process for the battery module status sensors.

As described above, the numbered ID codes ID1 to ID12 as the ID information are sequentially assigned to the battery modules 5A to 5L in accordance with their arrangement order. Refer to FIG. 2. Alternatively, the numbered ID code ID1 may be assigned to the battery module 5G at first as shown in FIG. 8.

The invention has been described by assuming that it is applied to the electric vehicle which includes the motor 2. Further, the invention is effectively applicable to a so-called hybrid type electric vehicle which includes an internal combustion engine and a motor 2. Still further, the invention is effectively applicable to an electric vehicle which includes a power unit constituted by a plurality of battery cells.

INDUSTRIAL APPLICABILITY

The invention is applicable to a batter arrangement system which can reliably and easily manage a power source of an electric vehicle having a plurality of battery cells.

What is claimed is:

1. A battery management system comprising:
   a power source constituted by a plurality of battery modules having battery cells;
   battery module status sensors mounted on the battery modules on the one to one basis, detecting voltages and temperatures of the battery modules, and mutually connected in series by a communication line for transmitting numbering data, and each battery module status sensor assigning itself with an ID code on the basis of ID information received from an upstream battery module status sensor, and transmitting the ID information as well as the ID code to a downstream battery module status sensor; and
   a control unit judging statuses of the battery modules on the basis of data detected by the battery module status sensors, connected to the battery module status sensors via the communication line for transmitting numbering data and a communication line for transmitting various data except for the numbering data, and locating an abnormal battery module on the basis of detection information received via the communication line for transmitting numbering data and the communication line for transmitting various data except for the numbering data.

2. The battery management system defined in claim 1, wherein the battery module status sensors and the control unit are circularly connected by the communication line for transmitting the numbering data.

* * * * *